(12) United States Patent
Child et al.

(10) Patent No.: US 8,830,663 B2
(45) Date of Patent: Sep. 9, 2014

(54) APPARATUS, SYSTEM, AND METHOD FOR ATTACHING PERIPHERAL ITEMS TO DEVICES

(75) Inventors: Eric Child, Highland, UT (US); Whitney Clayton, Salt Lake City, UT (US); Stephen B. Gates, Lehi, UT (US); Brent E. Barberis, Lehi, UT (US)

(73) Assignee: Ligar Group, LLC, Salt Lake City, UT (US)

( * ) Notice: Subject to any disclaimer, the term of this patent is extended or adjusted under 35 U.S.C. 154(b) by 396 days.

(21) Appl. No.: 13/218,291

(22) Filed: Aug. 25, 2011

(65) Prior Publication Data

US 2012/0050968 A1    Mar. 1, 2012

Related U.S. Application Data

(60) Provisional application No. 61/376,970, filed on Aug. 25, 2010.

(51) Int. Cl.
*H05K 5/00* (2006.01)

(52) U.S. Cl.
USPC .................................................. 361/679.01

(58) Field of Classification Search
USPC ...................... 361/679.01; 224/269
See application file for complete search history.

(56) References Cited

U.S. PATENT DOCUMENTS

| | | | |
|---|---|---|---|
| 5,604,050 A | 2/1997 | Brunette et al. | |
| 6,869,395 B2 | 3/2005 | Page et al. | |
| 7,153,212 B1 | 12/2006 | Karten et al. | |
| 7,233,319 B2 | 6/2007 | Johnson et al. | |
| 7,861,985 B2 | 1/2011 | Galvin | |
| 7,963,494 B2 | 6/2011 | Hsiung et al. | |
| 7,969,732 B1 | 6/2011 | Noble | |
| 7,988,114 B2 | 8/2011 | Coleman et al. | |
| 8,016,107 B2 * | 9/2011 | Emsky | 206/320 |
| 2003/0010799 A1 | 1/2003 | Ashing et al. | |
| 2005/0072872 A1 | 4/2005 | Shack et al. | |
| 2005/0284904 A1 * | 12/2005 | Knapp et al. | 224/269 |

(Continued)

FOREIGN PATENT DOCUMENTS

| | | |
|---|---|---|
| JP | 2002142847 | 5/2002 |
| WO | 2009/045887 A1 | 4/2009 |
| WO | 2010/027694 A1 | 3/2010 |

OTHER PUBLICATIONS

"Installing Cliphanger Stick and Autohook", http://www.cliphanger.com/index.php?p_resource=home2, Apr. 2006.

(Continued)

*Primary Examiner* — Forrest M Phillips
(74) *Attorney, Agent, or Firm* — Kunzler Law Group

(57) ABSTRACT

An apparatus, system, and method are disclosed for attaching accessories to a portable electronic device. A device may be a cellular phone, mp3 player, or other device. An accessory may be an armband, a headphone management system, a stereo system, or other device. The accessories and devices may attach using associated device connector section and accessory connector section. The device connector section may adhere to a protection sheet, which in turn is directly attached to the device. The accessories may be removed when they are no longer in use, and may be swapped for other accessories that can attach to the device. Various embodiments of device connector sections and accessory connector sections can be used to make an appropriately secure connection between the device and accessory.

20 Claims, 20 Drawing Sheets

(56) References Cited

U.S. PATENT DOCUMENTS

| | | |
|---|---|---|
| 2006/0237495 A1* | 10/2006 | Chen et al. .................... 224/197 |
| 2007/0023559 A1* | 2/2007 | Scapillato et al. ......... 242/400.1 |
| 2007/0215659 A1* | 9/2007 | Knapp et al. .................. 224/269 |
| 2007/0287302 A1 | 12/2007 | Lindberg et al. |
| 2008/0103637 A1 | 5/2008 | Bliven et al. |
| 2008/0296449 A1 | 12/2008 | Carnevali |
| 2009/0184145 A1 | 7/2009 | Yeh |
| 2009/0189039 A1 | 7/2009 | LaBuda |
| 2010/0155550 A1 | 6/2010 | Weiss-Vons |
| 2010/0159741 A1 | 6/2010 | Rothbaum |
| 2010/0181450 A1 | 7/2010 | Hulick et al. |
| 2010/0315041 A1 | 12/2010 | Tan |
| 2011/0000945 A1 | 1/2011 | Mongan et al. |
| 2011/0031287 A1* | 2/2011 | Le Gette et al. ............. 224/101 |
| 2011/0064401 A1 | 3/2011 | Desorbo |
| 2011/0073743 A1 | 3/2011 | Shamie |
| 2011/0101058 A1 | 5/2011 | Heckman |
| 2011/0163211 A1 | 7/2011 | Cicco |
| 2011/0192857 A1 | 8/2011 | Rithbaum et al. |
| 2011/0240830 A1 | 10/2011 | Alemozafar et al. |
| 2011/0248838 A1 | 10/2011 | Krahenbuhl et al. |
| 2011/0248947 A1 | 10/2011 | Krahenbuhl et al. |
| 2011/0255226 A1* | 10/2011 | Duncan Seil et al. .... 361/679.01 |
| 2012/0234111 A1* | 9/2012 | Molyneux et al. ........ 73/862.541 |
| 2012/0327565 A1* | 12/2012 | Tages et al. .............. 361/679.01 |

OTHER PUBLICATIONS

DLO Jam Jacket with Cable Management for iPhone 1 G (Black), www.amazon.com/gp/.../ref=cm_cd_asin_lnk, know about as early as Oct. 2007.

Apple iPhone Skin Case with Headphone Holder-Black, www.talkietech.com/apipskcawihe2.html, known about as early as Jan. 2009.

PCT/US2011/049211, International Search Report and Written Opinion, Feb. 28, 2012.

"The Ultimate List of Apple iPad wall muonts", http://www.cocoontech.com/portal/lists/apple-ipad-mounts?resetfileters=0, known about as early as Nov. 27, 2011.

\* cited by examiner

APPARATUS, SYSTEM, AND METHOD FOR ATTACHING PERIPHERAL ITEMS TO DEVICES

CROSS-REFERENCE TO RELATED APPLICATION

This application claims the benefit of U.S. Provisional Patent Application No. 61/376,970 entitled "APPARATUS, SYSTEM, AND METHOD FOR ATTACHING PERIPHERAL ITEMS TO DEVICES", filed on Aug. 25, 2010, which is incorporated herein by reference.

FIELD

This invention relates to attaching peripheral items to a portable electronic device such as a cell phone.

BACKGROUND

The market for portable electronics is booming. Cellular phones, mp3 players, tablet computers, laptops, and other devices are growing in popularity and becoming ubiquitous. With these devices have come a host of peripheral items that can be used in connection with them. For example, headphones are a common peripheral item that is used with many portable electronics.

It can be challenging to keep these peripheral items with the device they are associated with. Headphones become easily tangled or lost. And while certain products have been developed to help manage these peripherals, they are generally only designed to handle one specific type of peripheral. Thus, a headphone management system can only handle headphones. In addition, a manufacturer may have to develop, prototype, and manufacture many iterations of the same product to accommodate the various product types. This means that different product lines need to be developed, for example, for the various brands of phones and devices. For example, one product line may work with the iPhone®, another with Blackberry® devices, etc.

SUMMARY

The present invention provides an approved connector for associating portable electronic device and related accessories. In one embodiment, the connector includes a device connector section with a device coupler that couples the device connector section to the portable electronic device. The device connector section may also have a first connection coupler that detachably couples the device connector section to an accessory connector section.

The connector may also include an accessory connector section with a second connection coupler that detachably couples the accessory connector section to the device connector section. The accessory connector section may also include an accessory coupler that couples the accessory connector section to the accessory for the portable electronic device. In certain embodiments, the accessory coupler that couples the accessory connector section to the accessory is integral to the accessory. The accessory coupler may, for example, be molded into the accessory.

In certain embodiments, the connector also includes a protection sheet that connects directly to the portable electronic device. The device coupler may couple the device connector section to the portable electronic device with the protection sheet intermediate. The device coupler may make a substantially permanent connection between the portable electronic device and the device connector section. The device coupler may be, for example, an adhesive. The device coupler may also be a case for the portable electronic device, or a replacement backing for the portable electronic device.

The first connection coupler may engage the second connection coupler using a quarter turn locking system. In certain embodiments, the first connection coupler is a female connection coupler, and the second connection coupler is a male connection coupler.

The invention may also be realized as a system that includes a portable electronic device with a back side that is opposite the display side of the portable electronic device, and an accessory for the portable electronic device. The connector may be coupled to the back side of the portable electronic device, and detachably couple the portable electronic device and the accessory.

The invention may also be realized as a method for connecting the portable electronic device with an accessory. The method may involve making a substantially permanent connection between the back side of the portable electronic device and a device coupler of the device connector section. The method may also involve aligning the first connection coupler of the device connector section with a second connection coupler of the accessory connector section, and engaging the first connection coupler and the second connection coupler such that the first connection coupler is detachably coupled to the second connection coupler.

Engaging the first connection coupler and the second connection coupler may involve turning the first connection coupler forty-five degrees relative to the second connection coupler.

The above summary is provided for convenience only, and is not intended by way of limitation. The meaning of the claims, and terms used therein, are more fully provided in the detailed description below.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
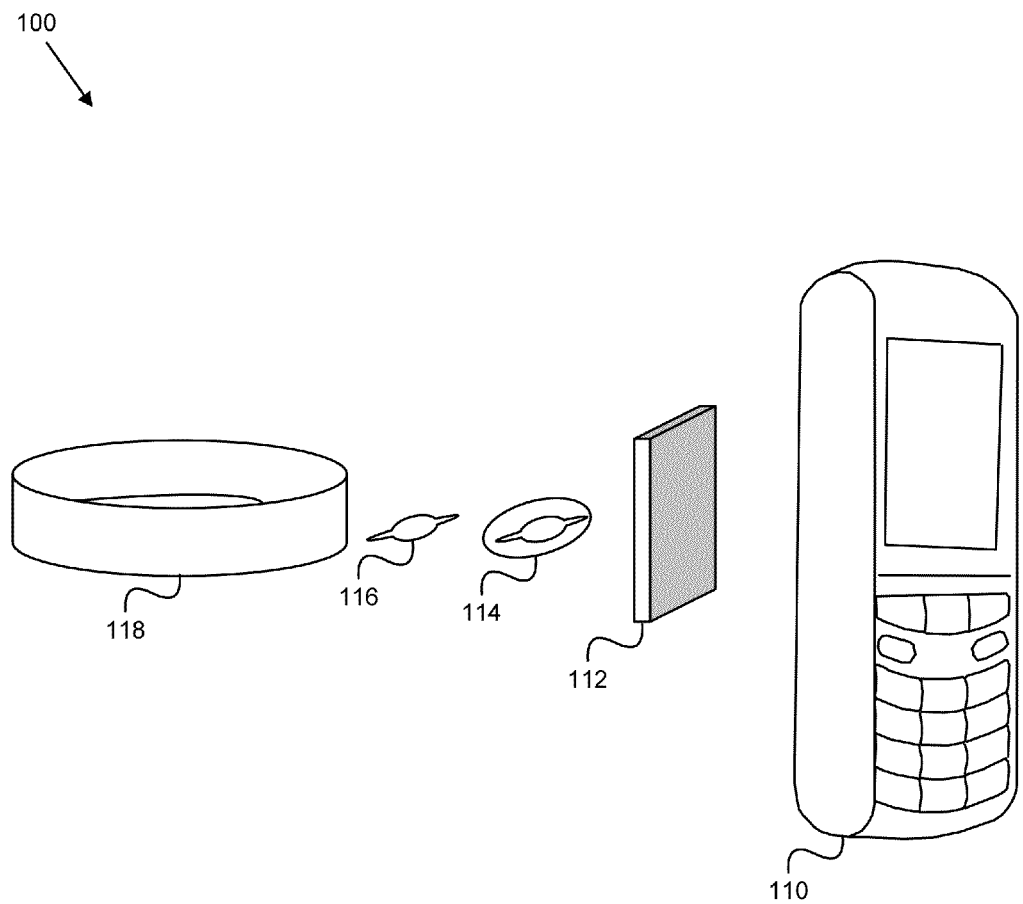
FIG. 1 is an exploded view illustrating one embodiment of a system for attaching peripherals to a device.

FIG. 1 depicts one embodiment of a system 100 (exploded view) for attaching peripheral items (also referred to as accessories) to devices. In one embodiment, the system 100 includes a portable electronic portable electronic device 110, a protection sheet 112, a device connector section 114, an accessory connector section 116, and an accessory 118. The system 100 may include less or more components than those shown in FIG. 1.

The portable electronic portable electronic device 110 is a physical, portable electronic item which can be used in connection with one or more accessories 118. These accessories 118 may be made by the portable electronic device 110 manufacturer, third-parties, or both. The portable electronic device 110 may be, for example (and as shown in FIG. 1), a cellular phone. The portable electronic device 110 may also be a music player, a tablet computer, or other variety of portable electronic device. Any number of categories of portable electronic devices 110 may benefit from the approach to attaching peripheral items disclosure herein.

The portable electronic device 110 may have one or more associated accessories 118. For example, a portable electronic device 110 that is a phone may have headphones, a Bluetooth® headset, a jogging band, and a mount that attaches the device to a bike. In certain embodiments, the accessory 118 is simply a holder for another item. For example, the accessory 118 may be a pen holder, a glasses holder, or other. The accessory 118 may be an external speaker, a secondary display, an external battery, a belt clip to connect a portable electronic device 110 to a belt, a wallet, a headphone management system, or other category of peripheral. Example accessories 118 are discussed in greater detail below.

The system 100 also includes a connector comprising the device connector section 114 and the accessory connector section 116. The connector connects the portable electronic device 110 and the accessory 118. As described below, the connector detachably couples the accessory 118 and the portable electronic device 110 such that a user can attach or remove the accessory 118 as needed.

The device connector section 114 may include a device coupler that couples the device connection section 114 to the portable electronic device 110. In a preferred embodiments, the device coupler makes a substantially permanent connection between the portable electronic device 110 and the device connector section 114. As used herein, a substantially permanent connection is a connection that is unlikely to uncouple without an attempt by a user to specifically uncouple the device connection section 114. For example, the device coupler may be an adhesive.

In another embodiment, the device coupler may be a case for the portable electronic device 110. In such embodiments, the device coupler may be a hard case or a soft case (made of a material such as silicon) that fits around the periphery of the portable electronic device 110 and provides a measure of protection in the event the portable electronic device 110 is dropped or jostled. In another embodiment, the device coupler is a replacement backing for the portable electronic device 110. For example, the portable electronic device 110 may have a battery cover situated on the back side opposite the display side of the portable electronic device 110. In such an embodiment, the device connector section 114 may be an after-market battery cover that replaces the existing battery cover of the portable electronic device 110. Such a device connection section 114 may include a first connection coupler that detachably couples the device connector section 114 to the accessory connection section 116.

In certain embodiments, the system 100 also includes a protection sheet 112 that is placed between the portable electronic device 110 and the device connector section 114 such that the protection sheet 112 is between the device connector section 114 and the portable electronic device 110. The protection sheet 112 may connect securely to the portable electronic device 110 and also connect securely to the device connector section 114. In one embodiment, the protection sheet 112 is part of a case that fits the portable electronic device 110. In other embodiments, the attachment piece is an adhesive strip that attaches securely to the device 119 (either directly, or attaching to a case for the portable electronic device 110). In certain embodiments, the protection sheet 112 can be removed without damaging or marking the portable electronic device 110 and provides a surface for the device connector section 114 to adhere to. In certain embodiments, the protection sheet 112 is a flexible sheet that allows the protection sheet 112 to conform to the shape of the portable electronic device 110 (whether the device itself, or a case for the device). For example, in one embodiment, the protection sheet 112 is a clear film such as invisibleSHIELD® material made and sold by ZAGG, Inc. The device coupler may couple the device connection section 114 to the portable electronic device 110 with the protection sheet 112 intermediate, as shown in FIG. 1.

The device connection section 114 may also include a first connection coupler that detachably couples the device connection section 114 to the accessory connection section 116. In one embodiment, the first connection coupler is a female connection coupler that is configured to receive and engage a second connection coupler of the accessory connection section 116. The second connection coupler, in such an embodiment, may be a male connection coupler.

The accessory connection section 116 may have an accessory coupler that couples the accessory connection section 116 to the accessory 118 for the portable electronic device 110. The accessory coupler may be integral to the accessory 118. For example, the accessory connector section 116 and the accessory 118 may be molded from the same piece of material. In other embodiments, the accessory coupler may be an adhesive that can be affixed to the accessory 118.

In certain embodiments, the device connector section 114 and the accessory connector section 116 make a mechanical connection. The device connector section 114 may be connected to the portable electronic device 110 using the protection sheet 112. The device connector section 114 may also connect directly to the portable electronic device 110. In other embodiments, the device connector section 114 is built into a case for the portable electronic device 110. The device connector section 114 could also be built directly into the portable electronic device 110; for example, a manufacturer of a device could build in a device connector section 114. In other embodiments, third-parties might build replacement parts for the back of the portable electronic device 110 that have a device connector section 114; for example, many cell phones have a removable back plate covering the battery—a back plate with a device connector section 114 could be manufactured to replace the standard back plate for the cell phone.

A variety of different connecting systems may be used to facilitate connecting the portable electronic device 110 and the accessory 118. The device connector section 114 may be a male connector component, and the peripheral connector 118 a female connector component, or vice versa. Various embodiments of the device connector section 114 and the accessory connector section 116, and how they may cooperate to make a connection, are shown in the figures. Other embodiments may also be used to effectuate a connection between a portable electronic device 110 and an accessory 118.

A system 100 such as that shown in FIG. 1 allows for easy interchangeability of accessories 118. For example, headphones can be organized with an accessory 118 for managing headphones, which accessory 118 attaches to the portable electronic device 110. If the headphones are no longer necessary, the accessory 118 can be uncoupled from the portable electronic device 110 and another accessory 118 attached. A person may, for example, have an accessory 118 that is a wallet and attached that accessory 118 to the portable electronic device 110 after removing the accessory 118 for managing headphones. As a result, a variety of accessories 118 can be provided for the portable electronic device 110, which accessories 118 can be attached and detached from the portable electronic device 110 as the user deems necessary.

Figure 2:
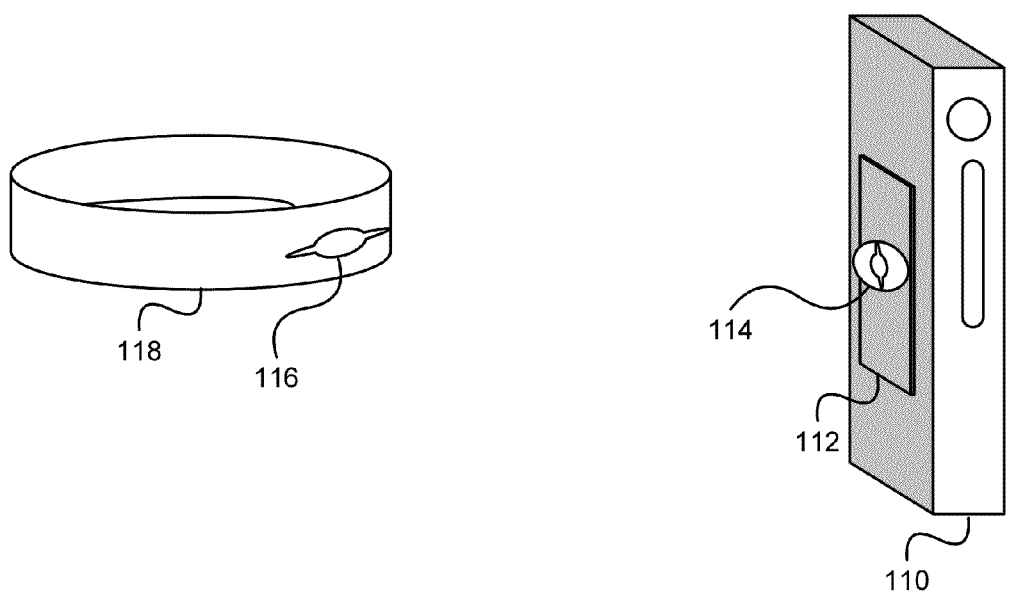
FIG. 2 is a view of a system for attaching peripherals to a device.

FIG. 2 shows one embodiment of an exemplary configuration of a system 100. The accessory 118 is coupled to the accessory connector section 116. As mentioned above, the coupling may be accomplished via an adhesive, the accessory connector section 116 may be built into the accessory 118, or the coupling may be accomplished using other known approaches. The portable electronic device 110 has the protection sheet 112 coupled to it. This protection sheet 112 may be a film. The device connector section 114 is coupled to the protection sheet 112. The device connector section 114 may couple to the protection sheet 112 using an adhesive. Using this system, the portable electronic device 110 may be easily connected and disconnected from the accessory 118. In addition, the accessory 118 may be easily coupled to other devices 110 using a compatible connector, and the portable electronic device 110 may be easily coupled to other accessories 118 using a compatible connector.

Figure 3:
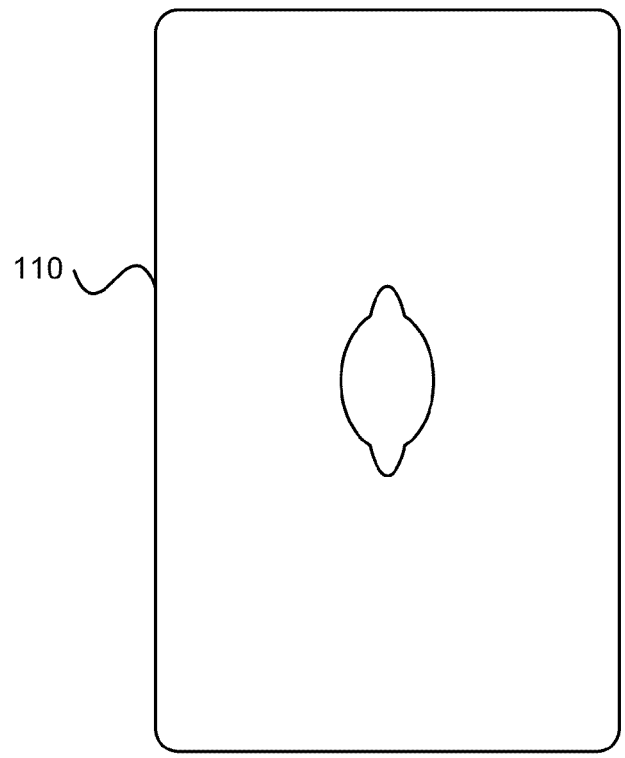
FIG. 3 is an illustration of one embodiment of a device connector.
Figure 3:
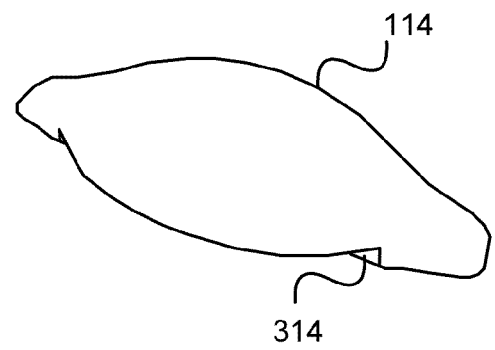

FIG. 3 shows one embodiment of a possible device connector section 114. As seen in FIG. 3, a portable electronic device 110 may have a device connector section 114 affixed to the portable electronic device 110. The device connector section 114 may be affixed to the portable electronic device 110 using a device coupler that is an adhesive. As described above, there may be a protection sheet 112 between the portable electronic device 110 and the device connector section 114.

The device connector section 114 in FIG. 3 is a slide mount type of connector. In the depicted embodiment, the first connection coupler are the ridges 314 that detachably couple the device connector section 114 to a compatible accessory connector section 116. The compatible accessory connector section 116 may have a second connection coupler that couples to the ridges 314 of the device connector section 114 by sliding into the ridges 314 seen on the device connector section 114. In certain embodiments, the accessory connector section 116 and the device connector section 114 have a locking mechanism that creates a secure attachment when the locking mechanism is engaged. A user may disengage the locking mechanism through a variety of ways, such as twisting while pushing down or while pulling up. Such a locking mechanism may be used to reduce the likelihood of unintentionally disengaging the device connector section 114 and the accessory connector section 116.

Figure 4:
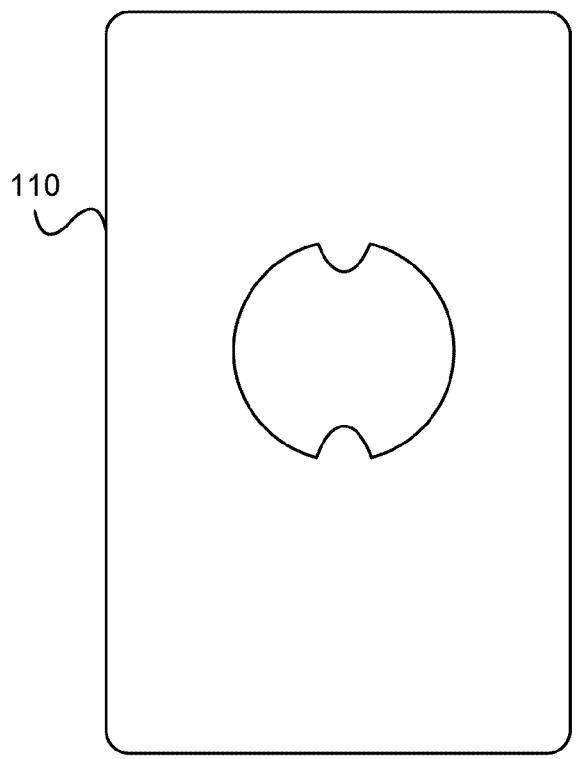
FIG. 4 is an illustration of one embodiment of a device connector.
Figure 4:
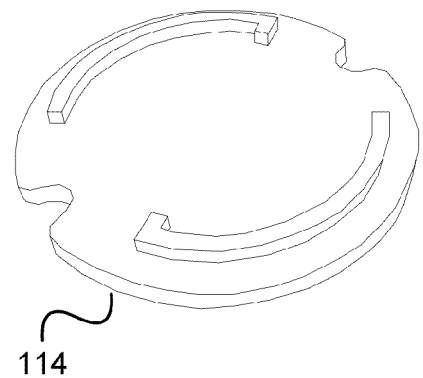

FIG. 4 is a second embodiment of a possible device connector section 114. The device connector section 114 in FIG. 4 is a twist mount style of device connector section 114. In such an embodiment, a compatible accessory connector section 116 engages the device connector section 114 by twisting. In certain embodiments, the accessory connector section 116 engages the first connection coupler that is the grooved ridge of the exemplary twist connector and also indentations on the twist connector (as seen in the larger representation of the device connector section 114). The device connector section 114 engages with the compatible accessory connector section 116 when the user turns the accessory connector section 116 90° after placing it on the device connector section 114.

Figure 5A:
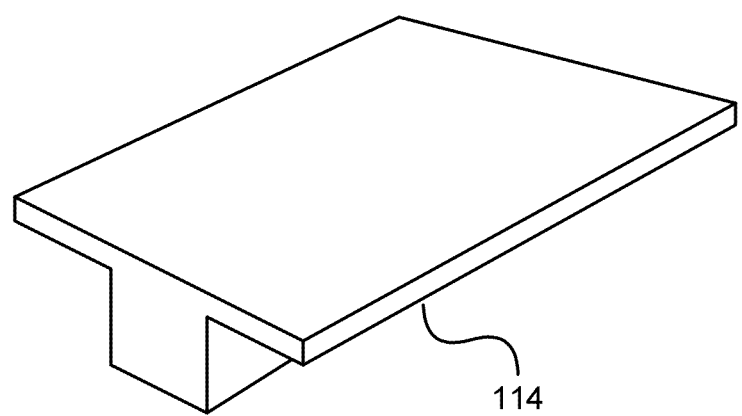
FIG. 5 is an illustration of one embodiment of a device connector.
Figure 5B:
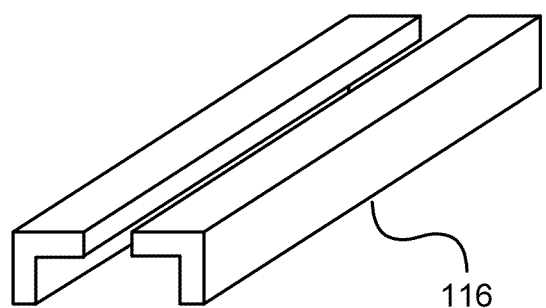

FIG. 5 shows another possible configuration, with a t-shaped device connector section 114. In such an embodiment, the first connection coupler is t-shaped. The second connection coupler of the accessory connector section 116 (seen in FIG. 5b) may be shaped such that it receives the t-shaped first connection coupler. In this manner, the first connection coupler detachably couples the device connector section 114 to the accessory connector section 116. Similarly, the second connection coupler detachably couples the accessory connector section 116 to the first connector section.

Figure 6A:
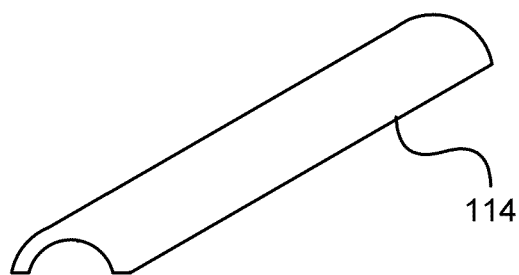
FIG. 6 is an illustration of one embodiment of a device connector.
Figure 6B:
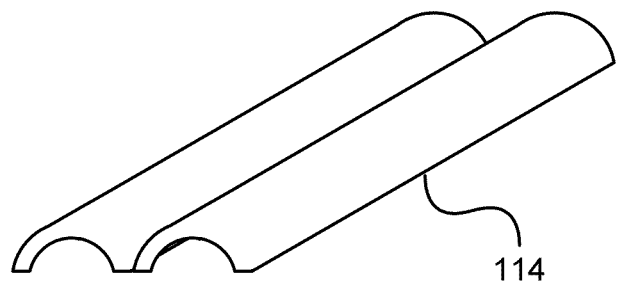
Figure 7:
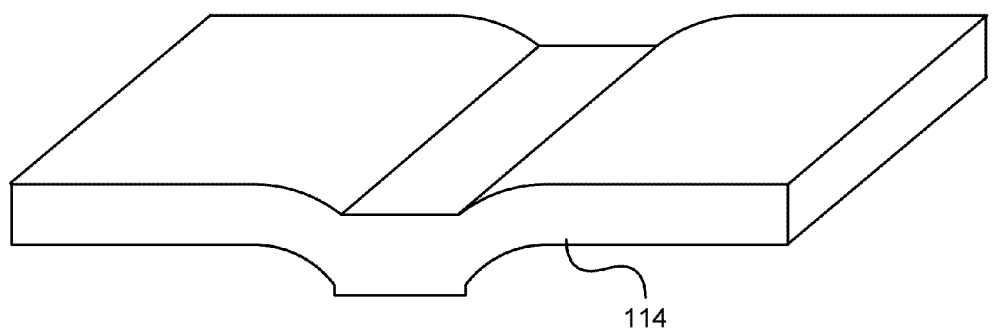
FIG. 7 is an illustration of one embodiment of a device connector.
Figure 9:
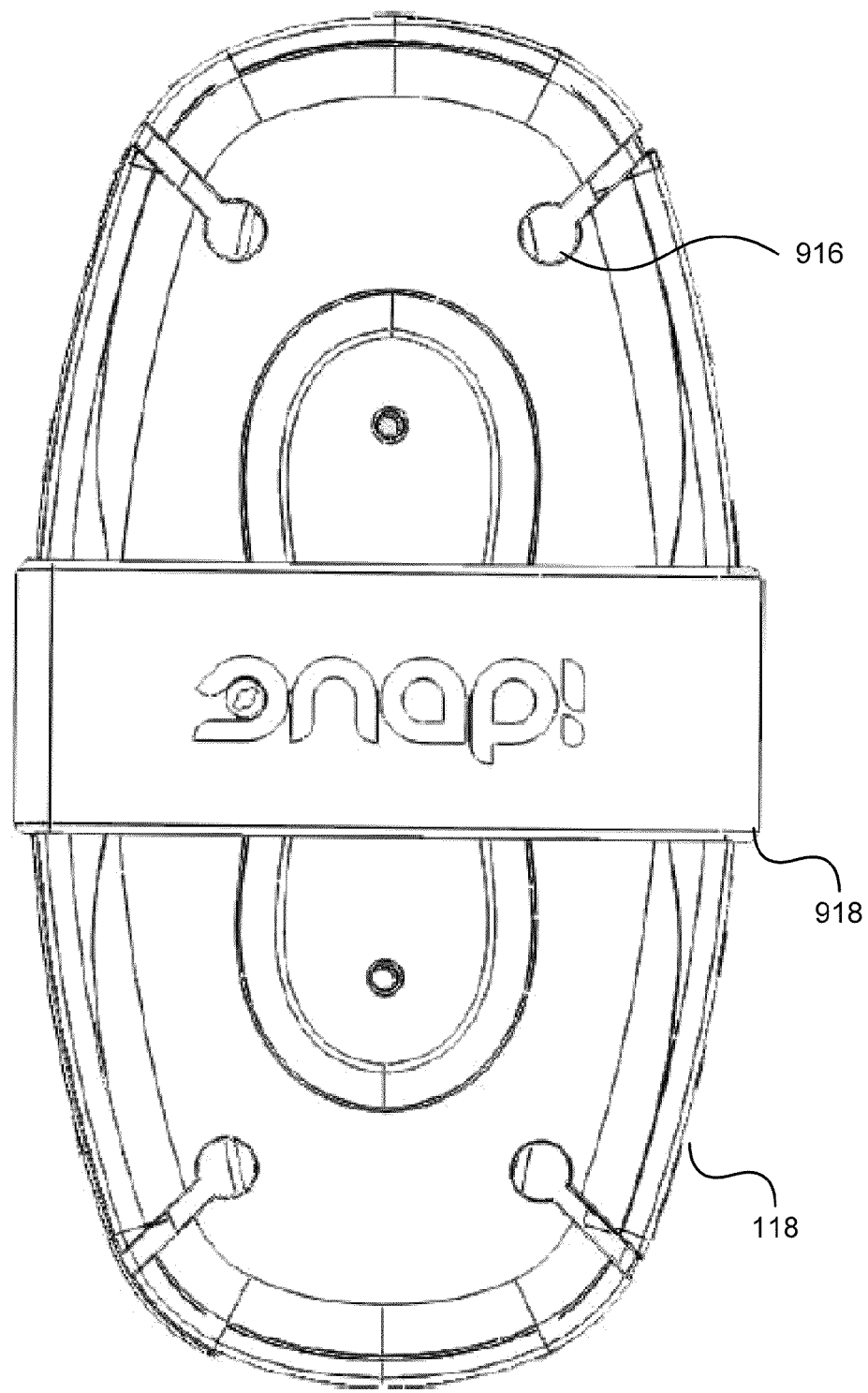
FIG. 9 is an illustration of one embodiment of a headphone management system from a front perspective.

FIG. 6 is another embodiment of a possible device connector section 114 having a first connection coupler that is an aperture. A corresponding accessory connector section 116 may have a second connection coupler that is a protrusion that fits within the aperture of the device connector section 114 and secures the connection. Also shown in FIG. 9 is an embodiment where there are two apertures that receive two corresponding protrusions of an accessory connector section 116. FIG. 7 shows an embodiment where the first connection coupler of the device connector section 114 includes two raised sections that can be secured an appropriately shaped accessory connector section 116.

Figure 8:
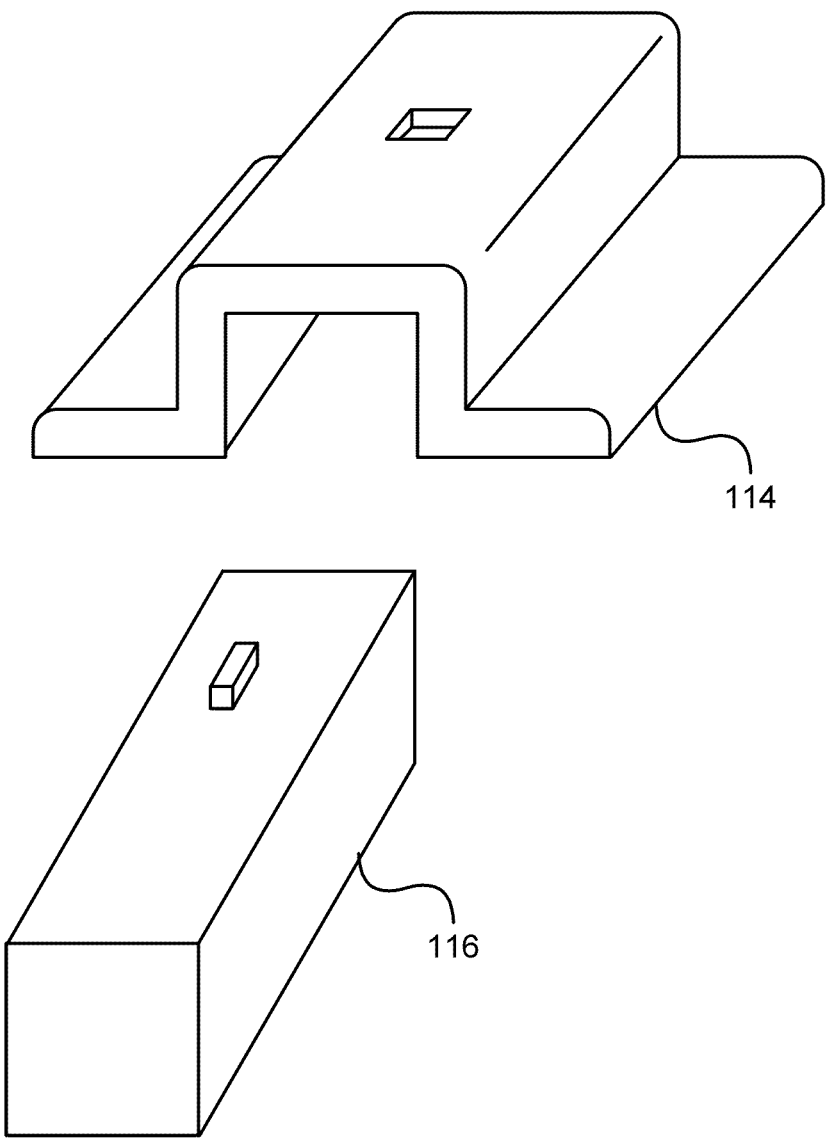
FIG. 8 is an illustration of one embodiment of a device connector.

FIG. 8 shows an additional embodiment of a device connector section 114 with a locking mechanism. The second connection coupler of the accessory connector section 116 is inserted into the aperture in the device connector section 114. At an appropriate depth of insertion, the tab on the accessory connector section 116 engages with the tab cavity shown on the device connector section 114 and locks the accessory connector section 116, and the device connector section 114, into place. The tab may be spring-loaded to allow for easy insertion of the accessory connector section 116 into the aperture, and to allow a user to easily disengage the accessory connector section 116 from the device connector section 114.

The depicted device connector sections 114 and corresponding first connection couplers are shown by way of illustration, and not by way of limitation. Other approaches to detachably coupling the device connector section 114 and the accessory connector section 116 are also possible and within the scope of the present invention.

FIG. 9 shows one embodiment of a possible accessory 118 for managing headphones for a portable electronic device 112. FIG. 9 presents a top view of the accessory 118. The accessory 118 may include a core (not seen in FIG. 9) around which the headphones can be wrapped, and a plurality of apertures 916 into which the headphones can be placed to secure the headphones after they are wrapped around the core. The accessory 118 may also include a band 918 for securing the buds of the headphones. The band 918 may be made of plastic, fabric, silicone, or other suitable material.

Figure 10:
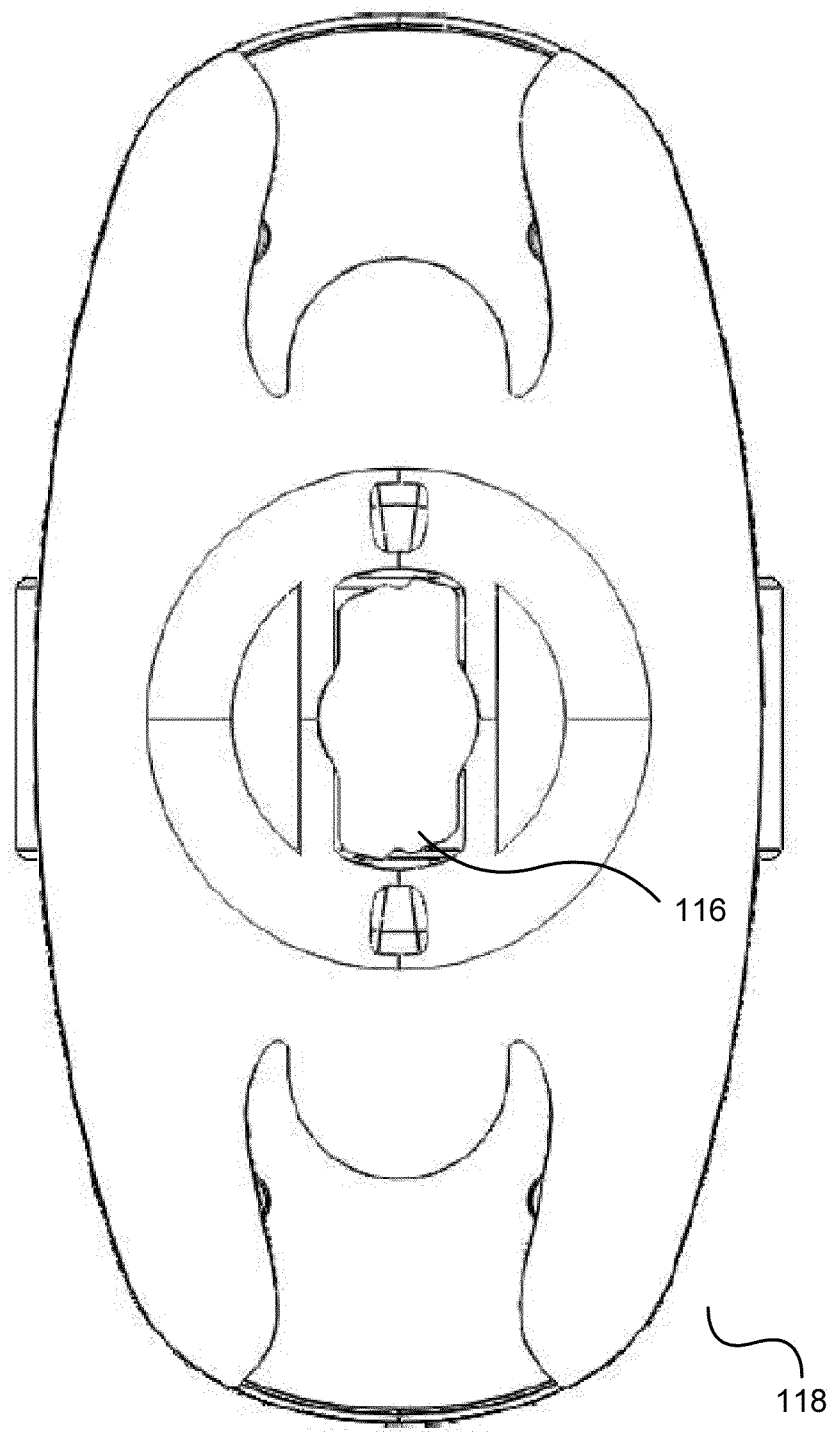
FIG. 10 is an illustration of one embodiment of a headphone management system from a back perspective.

FIG. 10 shows a bottom view of the accessory 118 for managing headphones. The bottom view shows the accessory connector section 116. In the depicted embodiment, the accessory connector section 116 includes a male second connection coupler that detachably couples the accessory connector section 116 to the device connector section 114.

Figure 11:
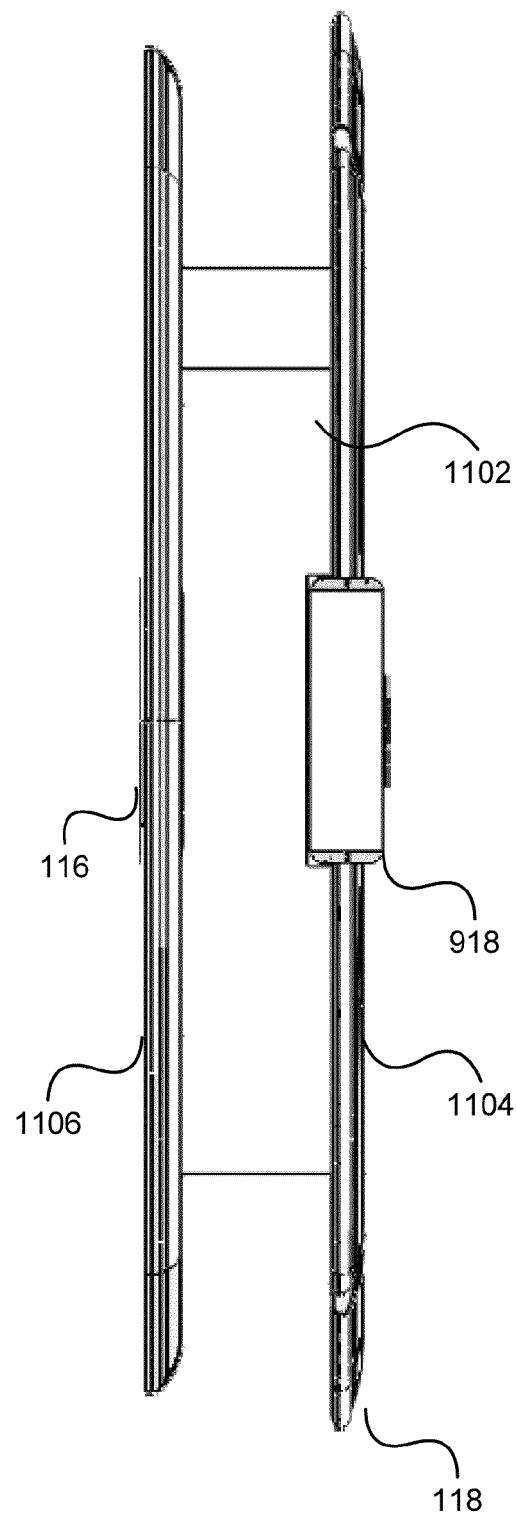
FIG. 11 is an illustration of one embodiment of a headphone management system from a side perspective.

FIG. 11 shows a side view of the accessory 118 for managing headphones. The side view shows the accessory connector section 116, which is on the bottom of the accessory 118. The accessory connector section 116 may be recessed within the accessory 118. The side view also shows the band 918. The side view also shows the core 1102 around which the headphones may be wrapped. The bottom base 1106 and the top base 1104 may extend beyond the core 1102 to help ensure that the headphones do not slip off of the core 1102 after they are wrapped around the core 1102. The accessory connection section 116 may be recessed within the core 1102.

Figure 12:
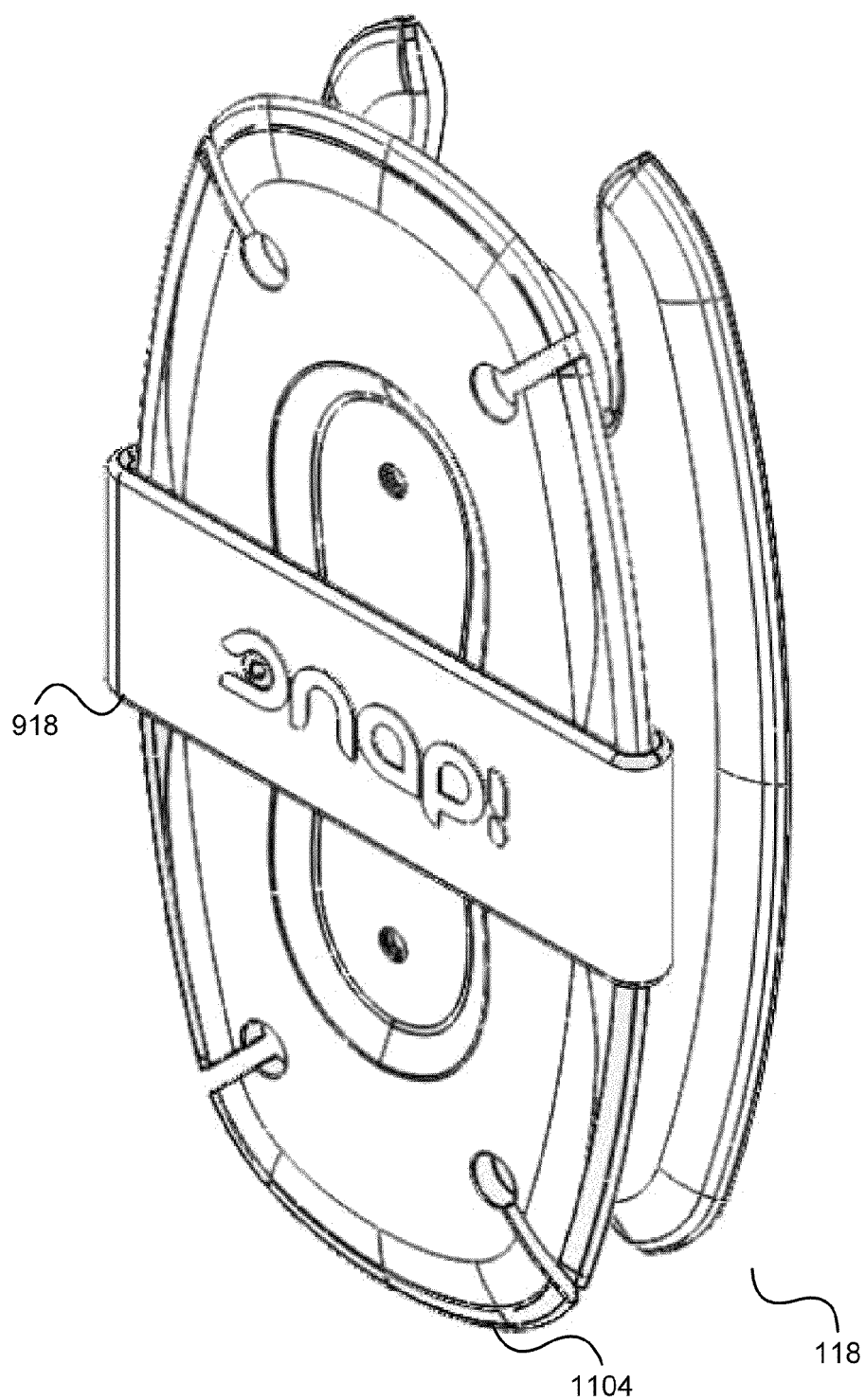
FIG. 12 is an illustration of one embodiment of a headphone management system from a three-quarters front perspective.

FIG. 12 shows a three-quarter view of the accessory 118 for managing headphones. In one embodiment, as seen in FIG. 12, the top base 1104 may have a recessed center section for receiving the ear buds. The recess may allow the buds to be better secured and reduce the likelihood that the ear buds catch on another object, damaging the ear buds or the other object.

Figure 13:
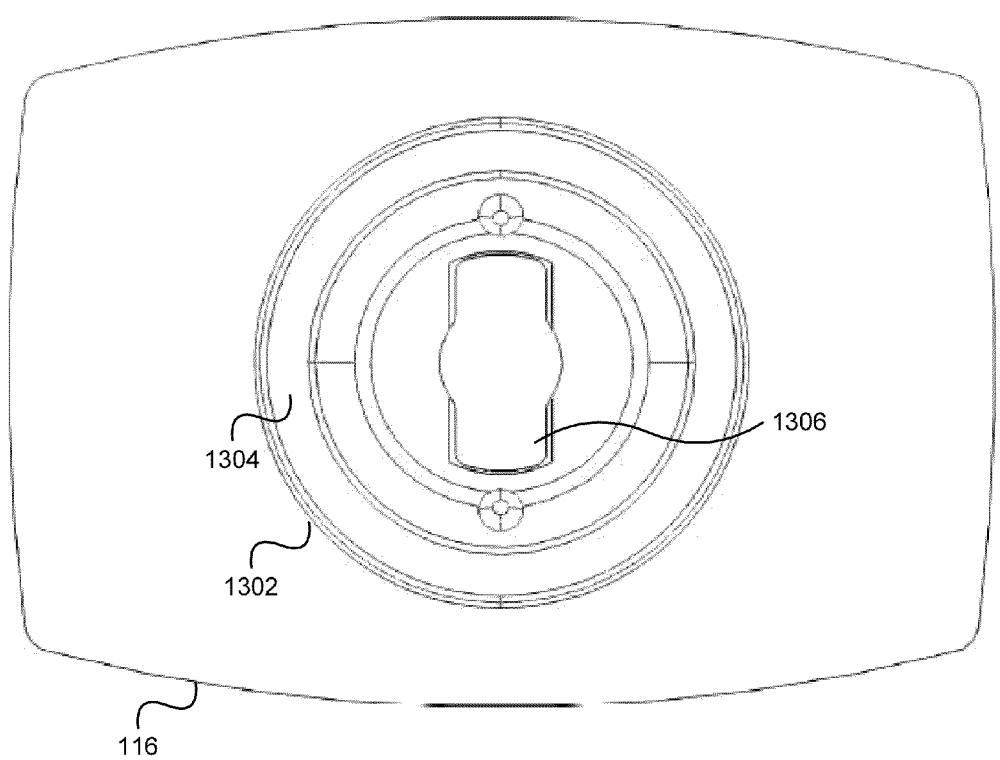
FIG. 13 is an illustration of one embodiment of an accessory connector section from a front perspective.

FIG. 13 shows one embodiment of an accessory connector section 116. In the depicted embodiment, the accessory connector section 116 includes a second connection coupler 1302 that detachably couples the accessory connector section 116 to a device connector section 114. In the depicted embodiment, the second connection coupler 1302 includes two connection components: first, the second connection coupler 1302 includes an impression 1304 recessed into the body of the accessory connector section 116 that is configured to fit a correspondingly shaped protrusion; second, the second connection coupler 1302 includes an male structure 1306. The elongated extension may extend outwards from the top of the impression 1304 and fit within a similarly shaped aperture in a device connector section 114.

Figure 14:
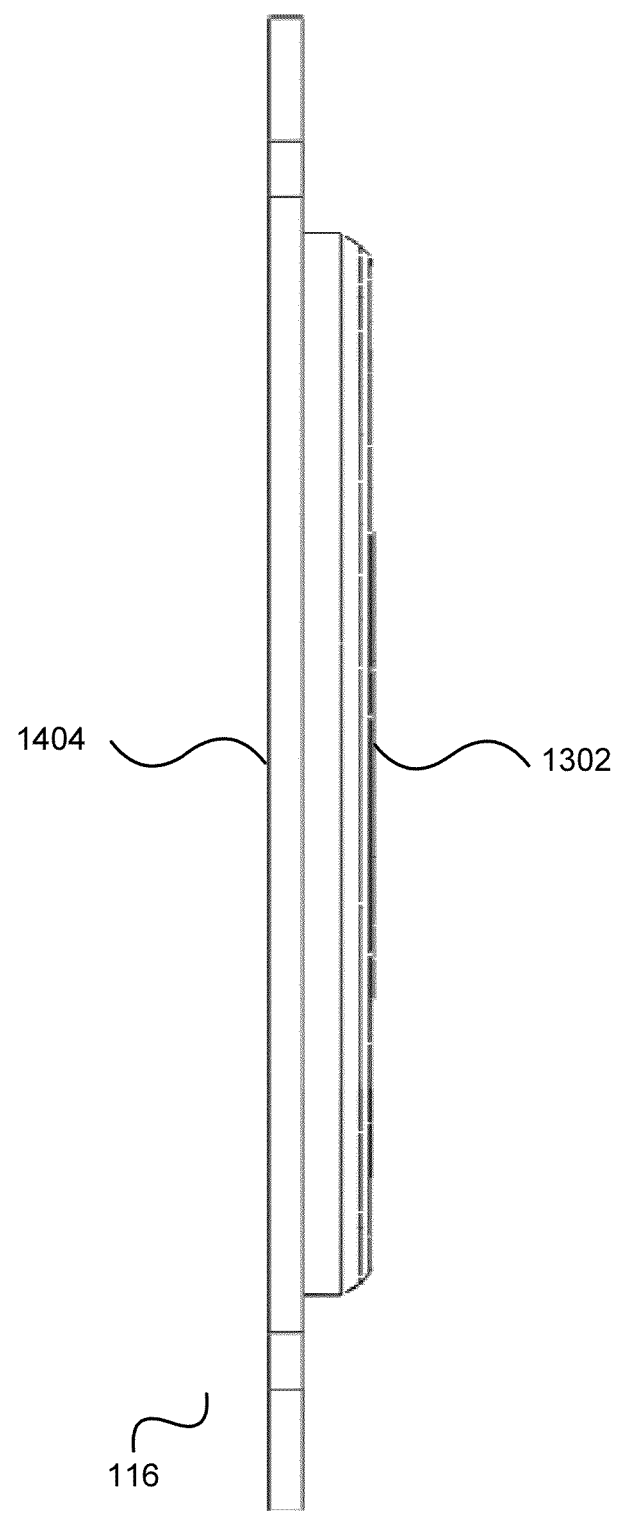
FIG. 14 is an illustration of one embodiment of an accessory connector section from a side perspective.

FIG. 14 shows one embodiment of a side view of the accessory connector section 116. The side view shows the second connection coupler 1302 protruding outwards. FIG. 14 also shows one embodiment of an accessory coupler 1404. In the depicted embodiment, the accessory coupler 1404 may be an adhesive that couples the accessory connector section 116 to an accessory 118. In other embodiments, the accessory coupler 1404 is integral to the accessory 118. In other embodiments, the accessory coupler 1404 is molded into the accessory 118.

Figure 15:
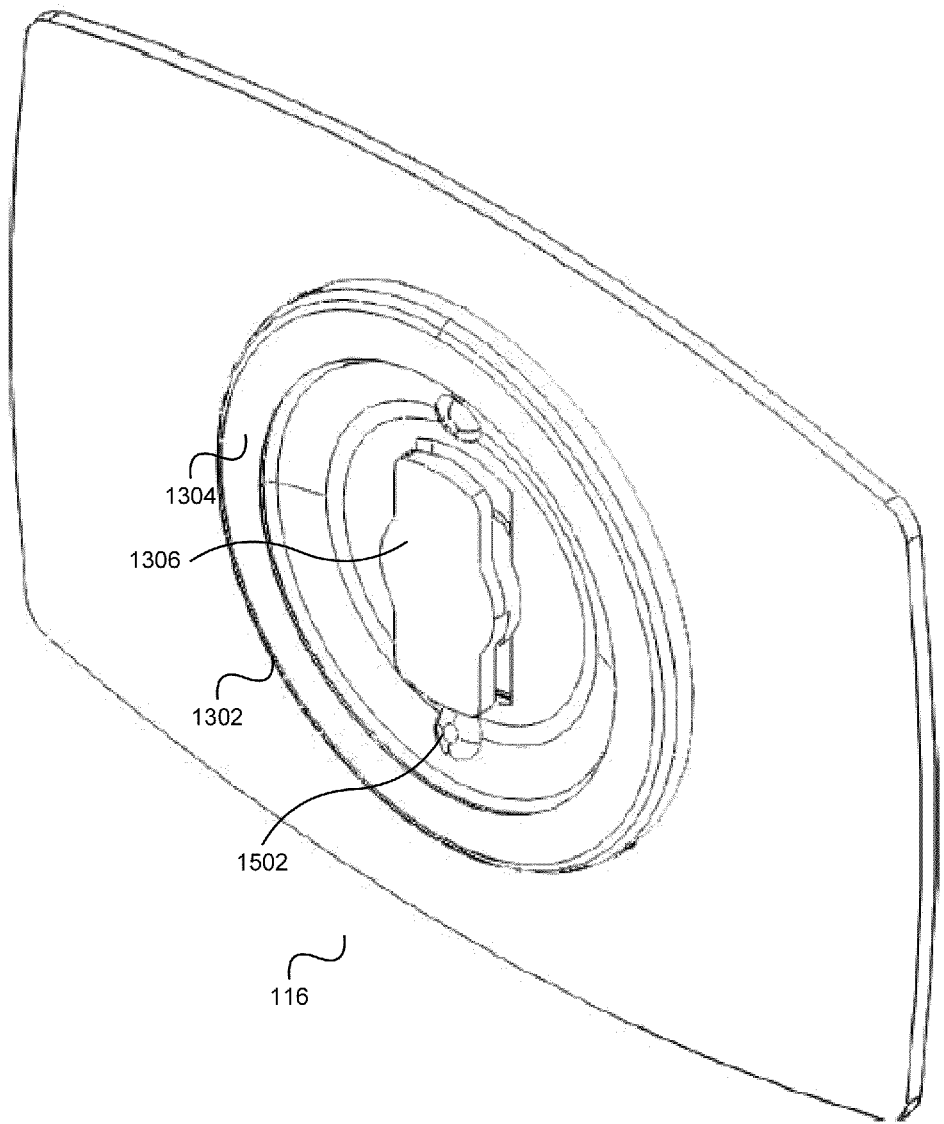
FIG. 15 is an illustration of one embodiment of an accessory connector section from a three-quarters front perspective.

FIG. 15 shows a perspective view of the accessory connector section 116. As seen in FIG. 15, and as mentioned above, the second connection coupler 1302 may include a male structure 1306, which may extend outwards from the top of the impression 1304. In certain embodiments, and as seen in FIG. 15, the impression 1304 may include sidewalls that extend away from the body of the accessory connector section 116. The side of the accessory connector section 116 opposite the side shown in FIG. 15 may include the accessory coupler that couples the accessory connector section 116 to the accessory 118 for the portable electronic device 110.

Figure 16:
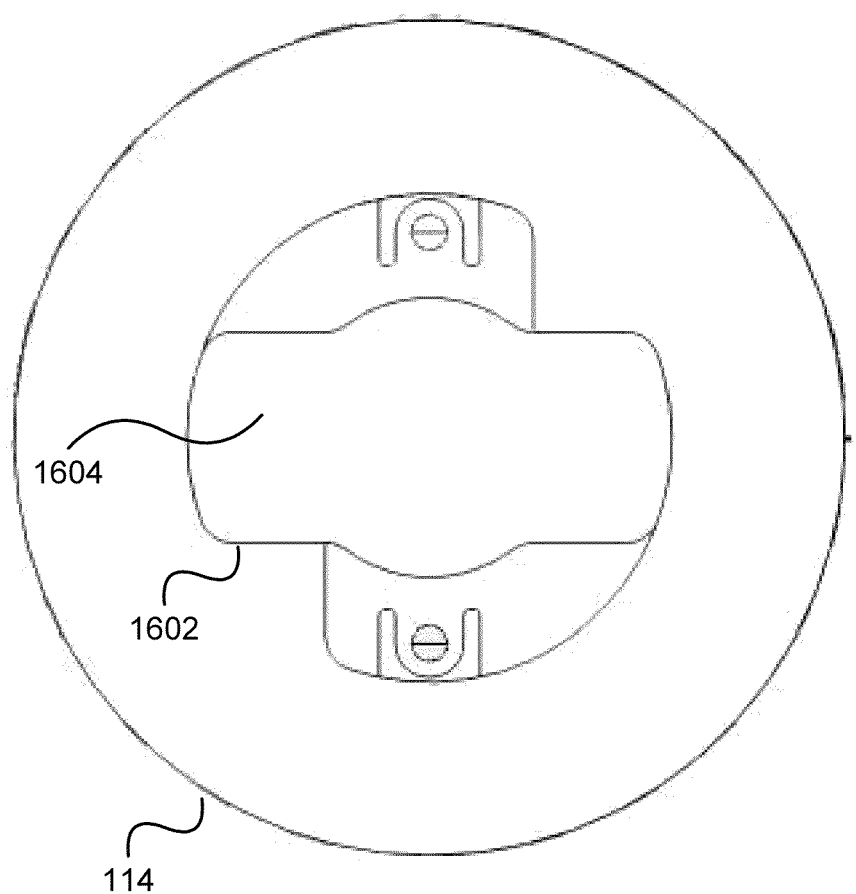
FIG. 16 is an illustration of one embodiment of a device connector section from a back perspective.

FIG. 16 shows one embodiment of a device connector section 114 having a first connection coupler 1602. FIG. 16 shows a back view of the device connector section 114. Other shapes and variations for a device connector section 114 are also possible. In the depicted embodiment, the device connector section 114 includes a first connection coupler 1602 that includes an aperture 1604 shaped to receive the male structure 1306 shown in FIG. 15. Thus, the device connector section 114 may be categorized as a female connection coupler.

Figure 17:
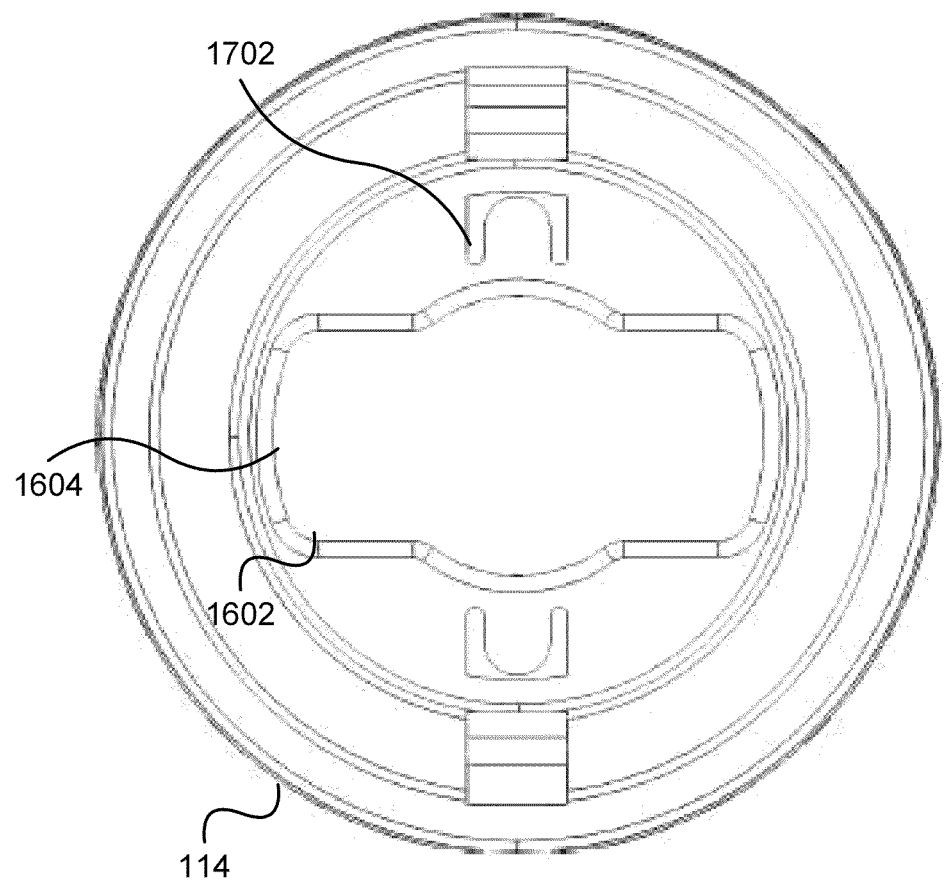
FIG. 17 is an illustration of one embodiment of a device connector section from a front perspective.

FIG. 17 shows an embodiment of the device connector section 114 from the front. The front view also shows the aperture 1604. FIG. 17 also shows that the device connector section 114 may be shaped as a protrusion that fits within the impression 1304 of the second connection coupler 1302. The protrusion may be shaped to fit within the impression 1304, and to help secure the device connector section 114 and the accessory connector section 116.

Figure 18:
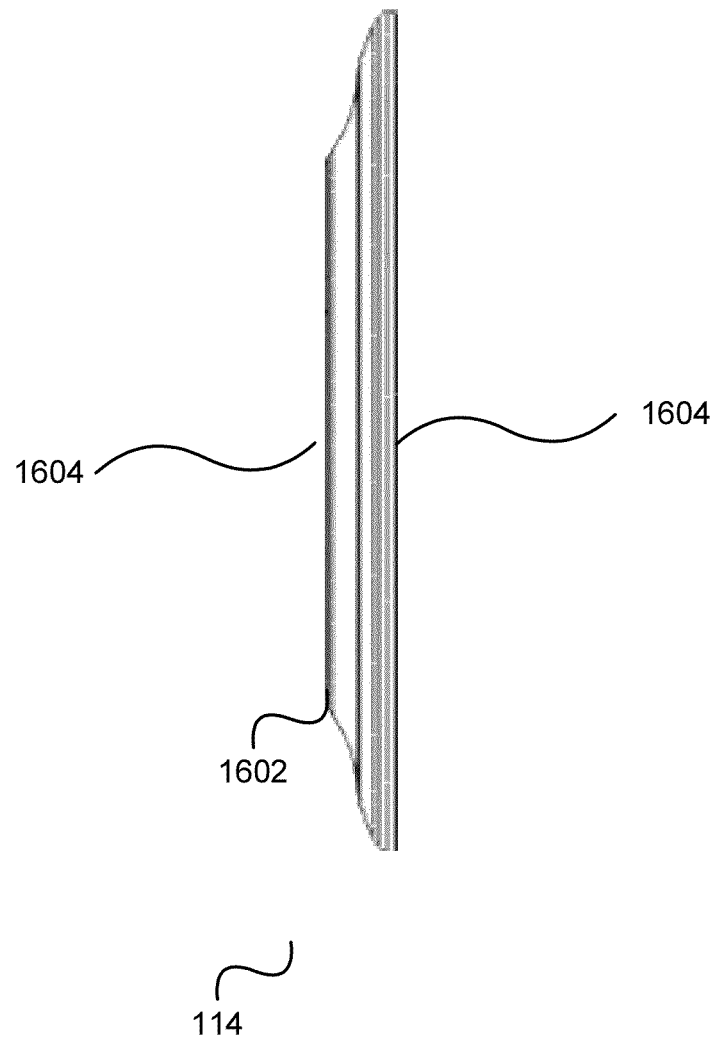
FIG. 18 is an illustration of one embodiment of a device connector section from a side perspective.

FIG. 18 shows an embodiment of the device connector section 114 from the side. As seen in the side view, the first connection coupler 1602 may be shaped as a protrusion to fit within a corresponding impression 1304 of the second connection coupler 1302. The protrusion, and the corresponding impression 1304, may be given any appropriate shape to facilitate a connection.

FIG. 18 also shows a device coupler 1604 that couples the device connector section 114 to the portable electronic device 110. The device coupler 1604 may be an adhesive coating on the back of the device connector section 114. The device coupler 1604 may be a mechanical connector for coupling the device connector section 114 to the portable electronic device 110. The device coupler 1604 may also use some combination of mechanical, chemical, and electromagnetic forces to couple the device coupler 1604 to the portable electronic device 110. In certain embodiments, the device coupler 1604 is a backing plate that covers the back of the device connector section 114 and includes an adhesive on the outer side of the backing plate.

Figure 19:
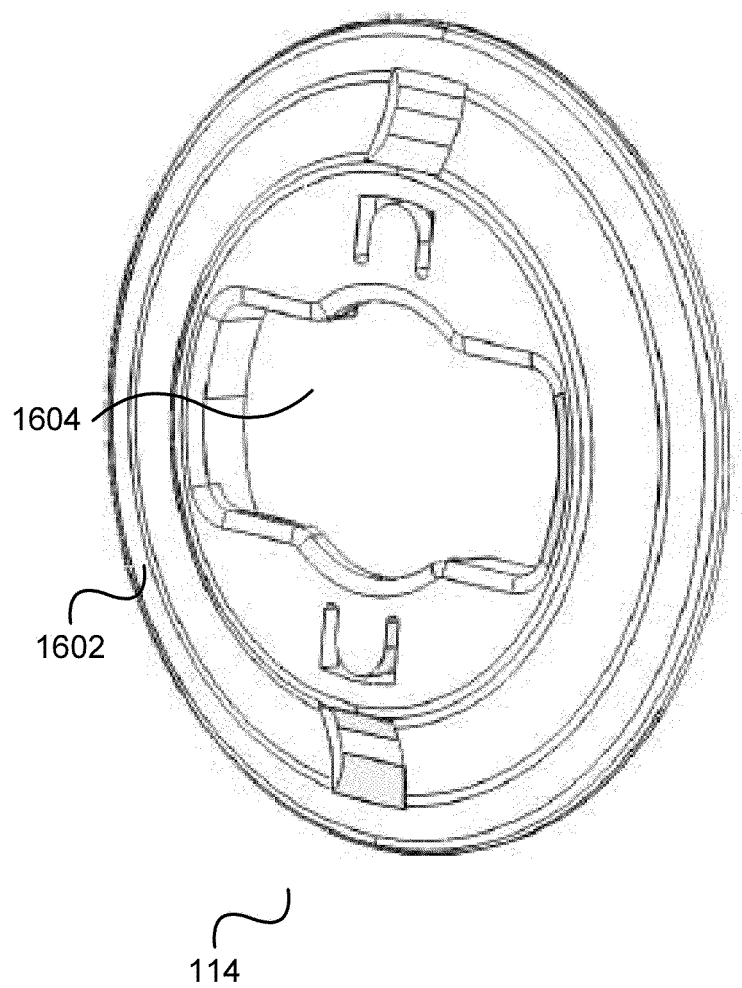
FIG. 19 is an illustration of one embodiment of a device connector section from a three-quarters front perspective.

FIG. 19 shows a three-quarter perspective of the device connector section 114 from the front. FIG. 19 shows how the device connector section 114 may form a protrusion, and also shows the aperture 1604 that may be configured to receive a corresponding male structure on the accessory connector section 116.

Figure 20:
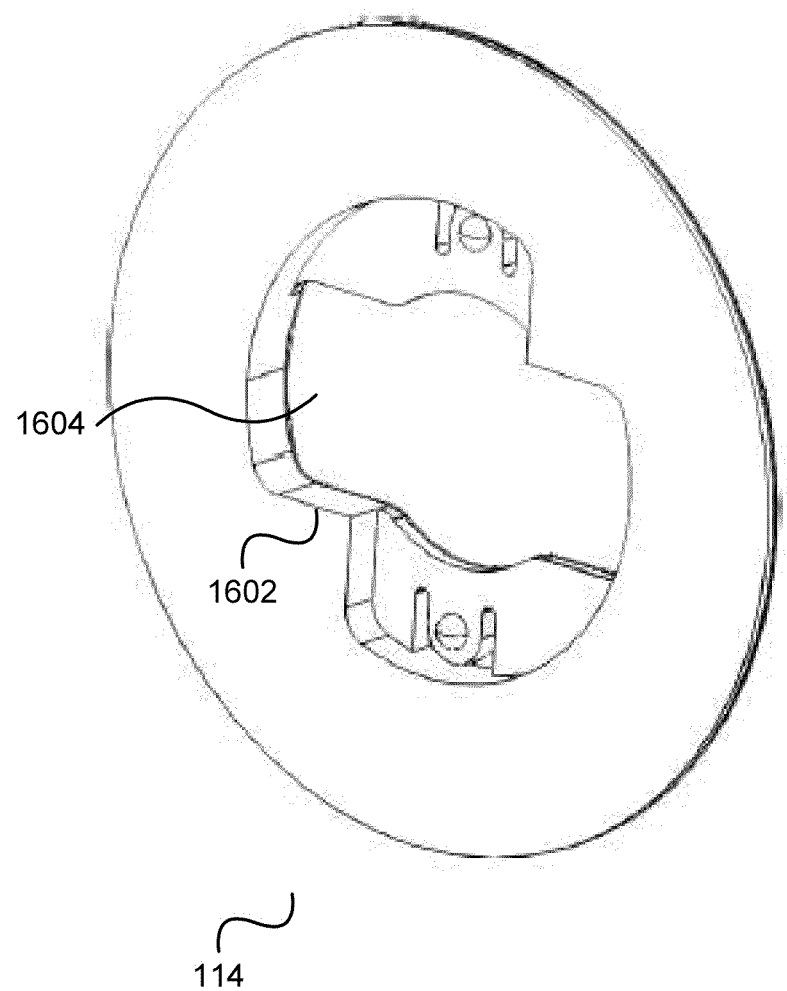
FIG. 20 is an illustration of one embodiment of a device connector section from a three-quarters back perspective.

FIG. 20 shows a three-quarter perspective of the device connector section 114 from the back. As seen in FIG. 20, the device connector section 114 may include an aperture that receives a corresponding structure on the accessory connector section 116. FIG. 20 also illustrates that the protrusion may be wholly or partially hollow on the back side of the device connector section 114. The hollow section of the device connector section 114 may allow the male structure of the accessory connector section 116 to be inserted through the aperture 1604, and turned after insertion. In the example shown in FIG. 20, the hollow section may restrict the direction in which the male structure is turned after insertion.

In certain embodiments, the accessory connector section 116 and the device connector section 114 have a locking mechanism that creates a secure attachment when the locking mechanism is engaged. FIG. 15 shows two locking protrusions 1502 as part of the second connection coupler 1302. FIG. 17 shows two lock receivers 1702 that can be shaped to fit the locking protrusions 1502. As a result, when the male structure 1306 is inserted into the aperture 1604, and the device connector section 1304 is turned a quarter turn, the locking mechanism engages when the locking protrusions 1502 engage the lock receivers 1702. The resulting connection may ensure a more stable and secure connection between the device connector section 114 and the accessory connector section 116.

The system may also benefit from a method for connecting the portable electronic device 110 and the accessory 118 for the same. In one embodiment, the method involves making a substantially permanent connection between a back side of the portable electronic device 110 and the device coupler 1604 of the device connector section 114. The method may also involve aligning the first connection coupler 1602 of the device connector section 114 with the second connection coupler 1302 of the accessory connector section 116.

The method may also involve engaging the first connection coupler 1602 and the second connection coupler 1302 such that the first connection coupler 1602 is detachably coupled to the second connection coupler 1302. In certain embodiments, engaging the first connection coupler 1602 and the second connection coupler 1302 involves turning the first connection coupler 1602 forty-five degrees relative to the second connection coupler 1302. In certain embodiments, this action engages a locking mechanism that secures the device connection section 114 and the accessory connector section 116.

In certain embodiments, the method also involves attaching a protection sheet 112 to the back side of the portable electronic device 110. The device coupler 1604 may be an adhesive. The device coupler 1604 may be fitted with an adhesive backing that prevents the device coupler 1604 from adhering to other objects before it can be coupled to the portable electronic device 110. The method may involve removing the adhesive backing of the device coupler 1604 and adhering the device coupler 1604 to the protection sheet 112.

In other embodiments, the device coupler 1604 is integrated within a protective case for the portable electronic device 110. In such an embodiment, making a substantially permanent connection between the back side of the portable electronic device 110 and the device coupler 1604 involves fitting the protective case to the portable electronic device 110.

In another embodiment, the device coupler 1604 is integral to a replacement battery cover for the portable electronic device 110. Making a substantially permanent connection between the back side of the portable electronic device 110 and the device coupler 1604 may involve removing the battery cover of the portable electronic device 110 and attaching the replacement battery cover.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A connector for connecting a portable electronic device and an accessory for the portable electronic device, the connector comprising:
   a device connector section having:
      a device coupler that couples the device connector section to the portable electronic device;
      a first connection coupler that detachably couples the device connector section to an accessory connector section; and
   the accessory connector section having:
      a second connection coupler that detachably couples the accessory connector section to the device connector section, wherein the first connection coupler engages the second connection coupler via a rotational locking system;
      an accessory coupler that couples the accessory connector section to the accessory for the portable electronic device.

2. The connector of claim 1, further comprising a protection sheet, the protection sheet connecting directly to the portable electronic device, and the device coupler coupling the device connector section to the portable electronic device with the protection sheet intermediate.

3. The connector of claim 1, wherein the device coupler makes a substantially permanent connection between the portable electronic device and the device connector section.

4. The connector of claim 3, wherein the device coupler is an adhesive.

5. The connector of claim 3, wherein the device coupler is one of a case for the portable electronic device and a replacement backing for the portable electronic device.

6. The connector of claim 1, wherein the accessory coupler is integral to the accessory for the portable electronic device.

7. The connector of claim 1, wherein the rotational locking system comprises using a quarter turn rotation.

8. The connector of claim 1, wherein the first connection coupler is a female connection coupler, and the second connection coupler is a male connection coupler.

9. A system for connecting a portable electronic device and an accessory for the portable electronic device, the system comprising:
- a portable electronic device having a back side opposite a display side of the portable electronic device;
- an accessory for the portable electronic device; and
- a connector, coupled to the back side of the portable electronic device, that detachably couples the portable electronic device and the accessory, the connector comprising:
  - a device connector section having:
    - a device coupler that couples the device connector section to the back side of the portable electronic device;
    - a first connection coupler that detachably couples the device connector section to an accessory connector section; and
  - the accessory connector section having:
    - a second connection coupler that detachably couples the accessory connector section to the device connector section, wherein the first connection coupler engages the second connection coupler via a rotational locking system;
    - an accessory coupler that couples the accessory connector section to the accessory for the portable electronic device.

10. The system of claim 9, wherein the accessory coupler and the second connection coupler are integral components of the accessory for the portable electronic device.

11. The system of claim 9, wherein the accessory coupler is an adhesive.

12. The system of claim 9, further comprising a protection sheet connecting directly to the back side of the portable electronic device, the device coupler coupling the device connector section to the back side of the portable electronic device with the protection sheet intermediate.

13. The system of claim 9, wherein the device coupler is an adhesive.

14. The system of claim 9, wherein the device coupler is an integral component of the back side of the portable electronic device.

15. The system of claim 9, wherein the first connection coupler is a female connection coupler, and wherein the second connection coupler is a male connection coupler.

16. A method for connecting a portable electronic device and an accessory for the portable electronic device, the method comprising:
- making a substantially permanent connection between a back side of a portable electronic device and a device coupler of a device connector section;
- aligning a first connection coupler of the device connector section with a second connection coupler of a accessory connector section, wherein the second connection section comprises an accessory coupler that couples the accessory connector section to an accessory for the portable electronic device; and
- engaging the first connection coupler and the second connection coupler such that the first connection coupler is detachably coupled to the second connection coupler, wherein engaging the first connection coupler and the second connection coupler comprises rotating one of the first and second connection coupler a certain degree relative to the other of the first and second connection coupler.

17. The method of claim 16, wherein engaging the first connection coupler and the second connection coupler comprises turning the first connection coupler forty-five degrees relative to the second connection coupler.

18. The method of claim 16, further comprising attaching a protection sheet to the back side of the portable electronic device, and wherein making the substantially permanent connection between the back side of the portable electronic device and the device coupler further comprises removing an adhesive backing of the device coupler and adhering the device coupler to the protection sheet.

19. The method of claim 16, wherein making a substantially permanent connection between the back side of the portable electronic device and the device coupler comprises fitting a protective case having an integral device coupler to the portable electronic device.

20. The method of claim 16, wherein making a substantially permanent connection between the back side of the portable electronic device and the device coupler comprises removing a battery cover of the portable electronic device and attaching a replacement battery cover having an integral device coupler to the portable electronic device.

* * * * *